United States Patent [19]

Mason

[11] Patent Number: 5,664,742
[45] Date of Patent: Sep. 9, 1997

[54] PLUME AVOIDANCE MANEUVERS

[75] Inventor: William J. Mason, Palo Alto, Calif.

[73] Assignee: The United States of America as represented by the Secretary of the Navy, Washington, D.C.

[21] Appl. No.: 387,741

[22] Filed: Jul. 31, 1989

[51] Int. Cl.$^6$ ............................................. F41F 7/00
[52] U.S. Cl. ...................... 244/3.22; 244/160; 244/169
[58] Field of Search ........................... 244/3.22, 160, 244/169

[56] References Cited

U.S. PATENT DOCUMENTS

| | | | |
|---|---|---|---|
| 3,231,223 | 1/1966 | Upper | 244/169 |
| 3,446,023 | 5/1969 | Mosier | 244/3.22 |
| 3,516,623 | 6/1970 | Sinden | 244/169 |
| 3,802,190 | 4/1974 | Kaufmann | 244/3.22 |
| 4,161,780 | 7/1979 | Rudolph | 244/169 |
| 4,386,750 | 6/1983 | Hoffman | 244/169 |
| 4,387,865 | 6/1983 | Howard et al. | 244/3.1 |
| 4,407,469 | 10/1983 | Fox | 244/169 |
| 4,550,888 | 11/1985 | Douglass et al. | 244/3.22 |
| 4,662,581 | 5/1987 | Samario | 244/3.22 |

Primary Examiner—Michael J. Carone
Attorney, Agent, or Firm—John Tarlano; Darrell Hollis

[57] ABSTRACT

A maneuver for minimizing perturbations on a released re-entry body due to gases exhausted from the nozzles of the post-boost control system in which after release of the re-entry body from a position compatible accomplishing with the maneuver, a flip turn is initiated in a near-nozzle-off configuration. The turn is preferably executed in a direction to the side of the direction of the velocity gain required for the platform to reach the next release location. The flip turn is stopped at a lateral escape angle, preferably after turning through an angle of 90 degrees or greater, by initiating an oppositely directed body-axis turn. After being accelerated for a lateral escape time, the platform is oriented in the direction of the required gain in velocity to reach the next release location and coarse thrust is activated. Prior to arrival at the release location, a body-axis turn is accomplished to orient the platform in the proper position for the next release event.

7 Claims, 8 Drawing Sheets

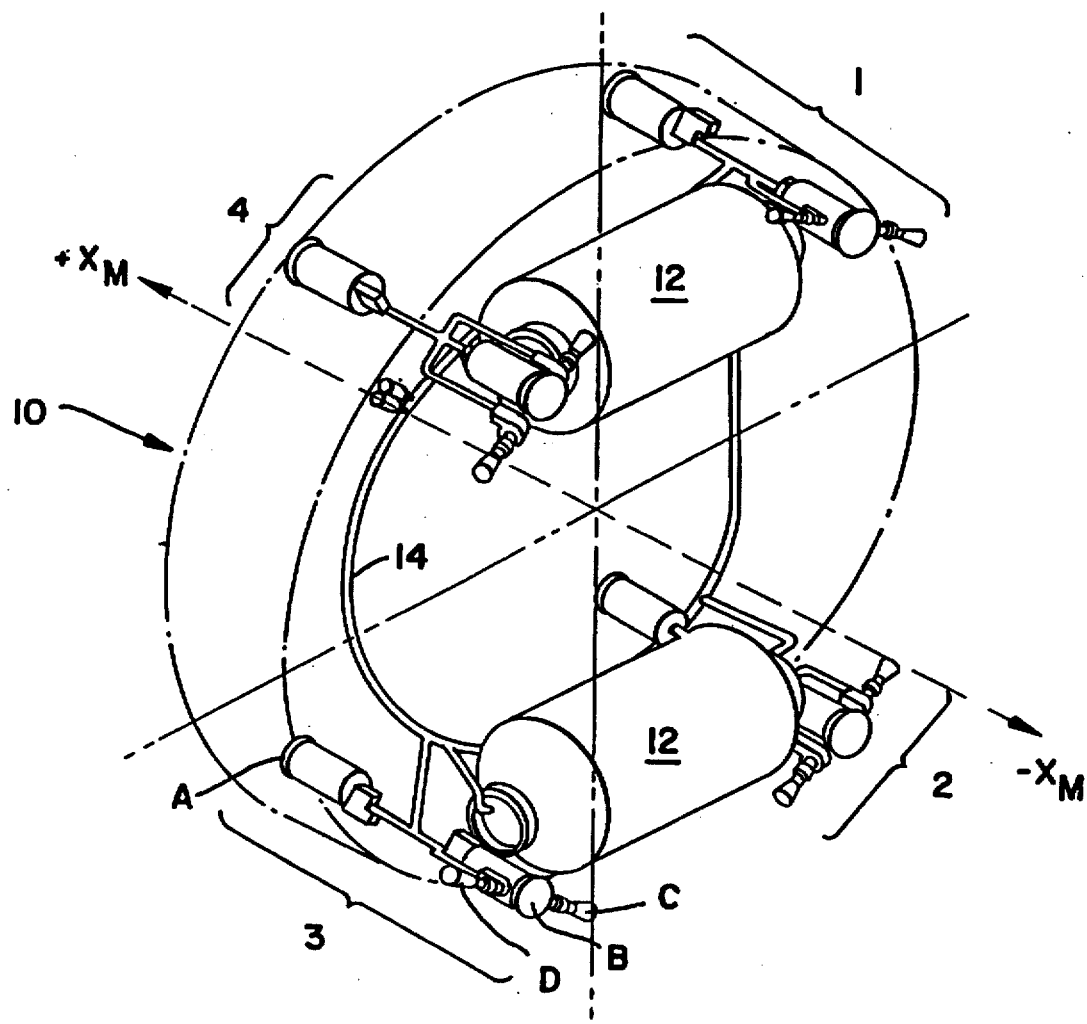
FIG_1
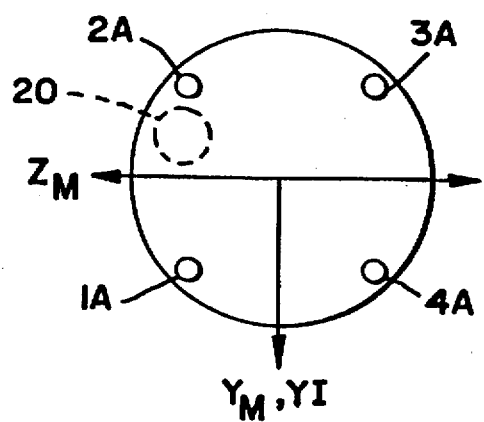
FIG_3
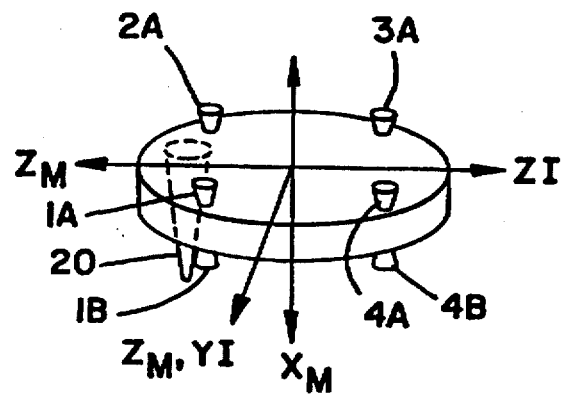
FIG_2

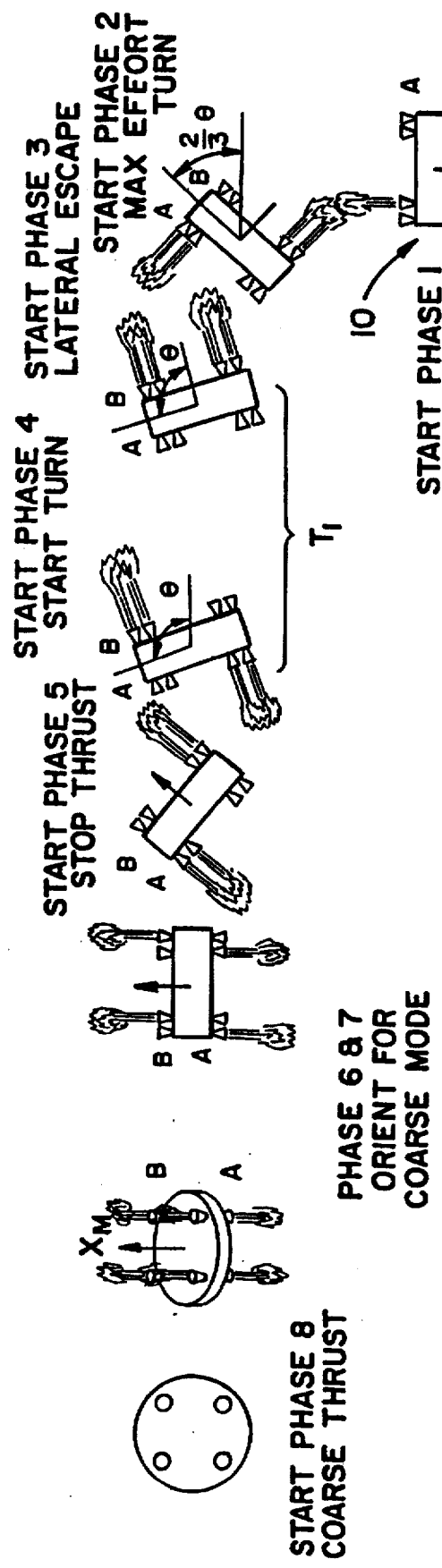
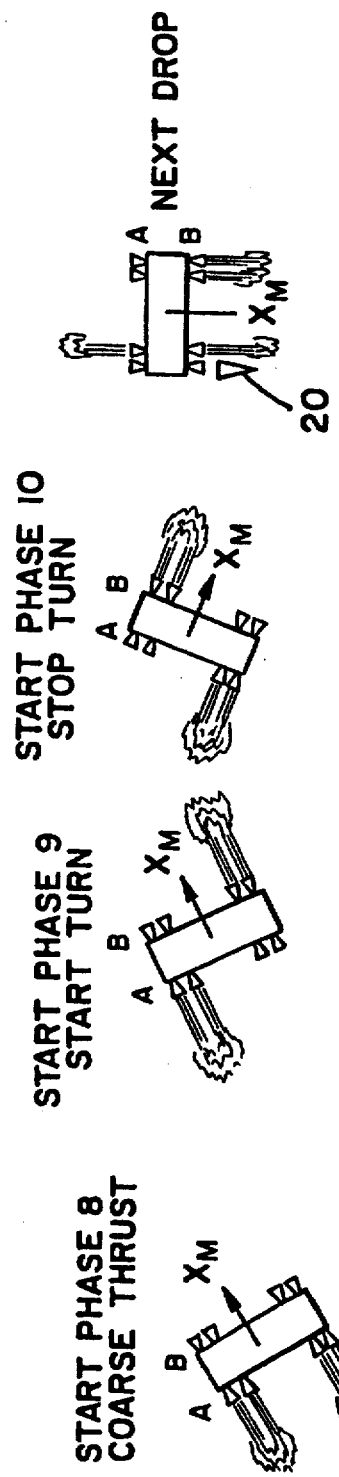
FIG.-4A
FIG.-4B

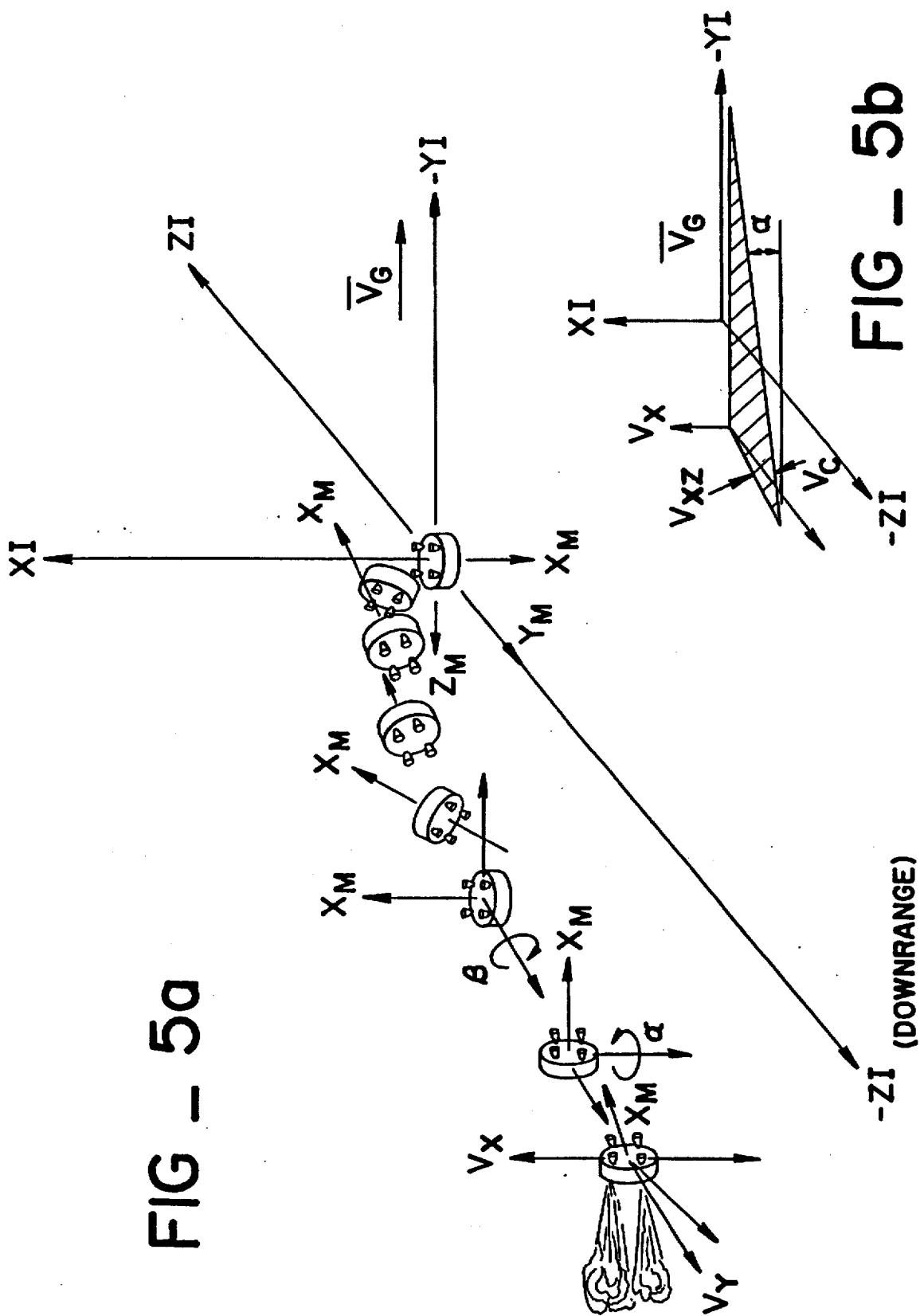

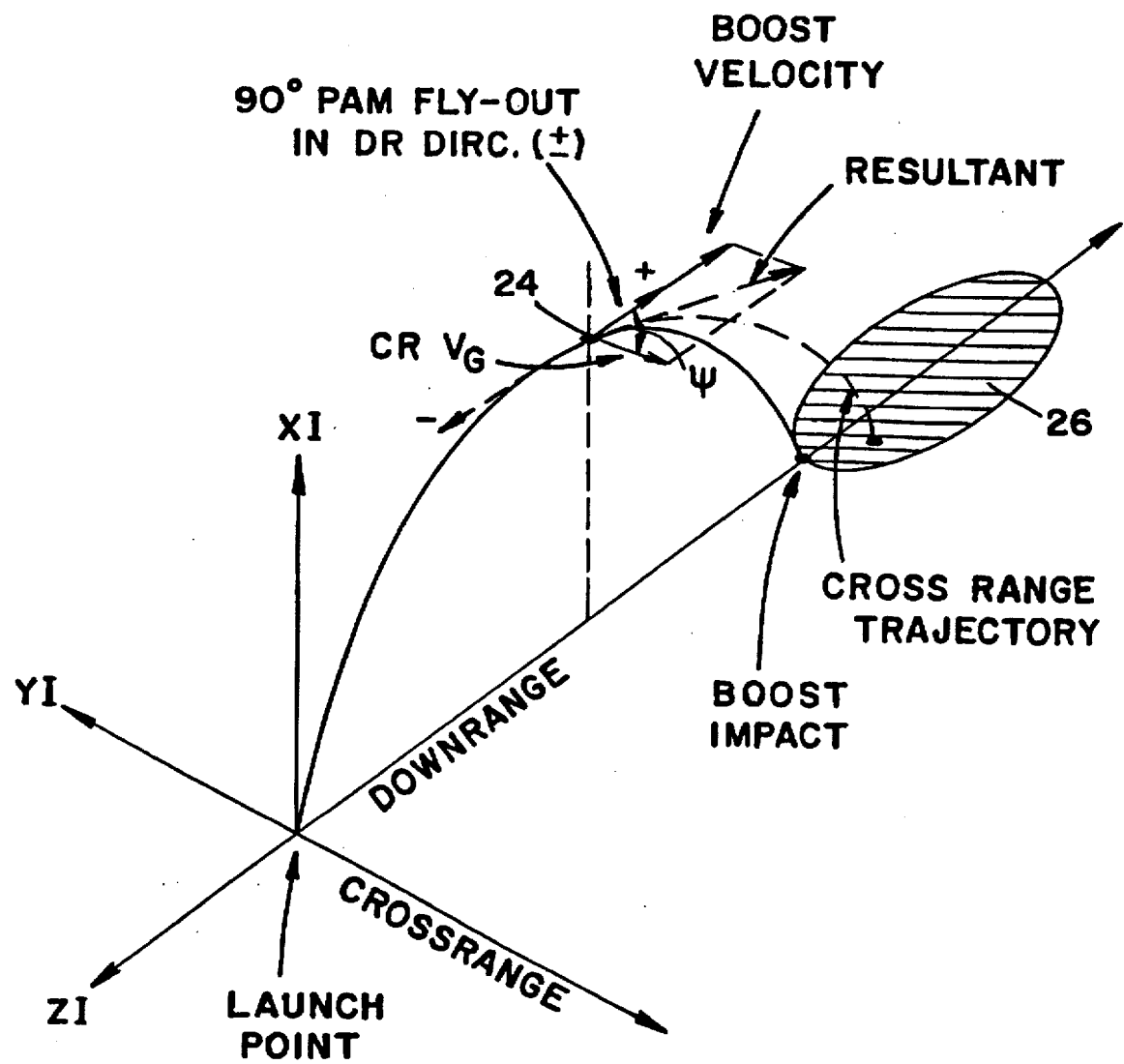
FIG_5c

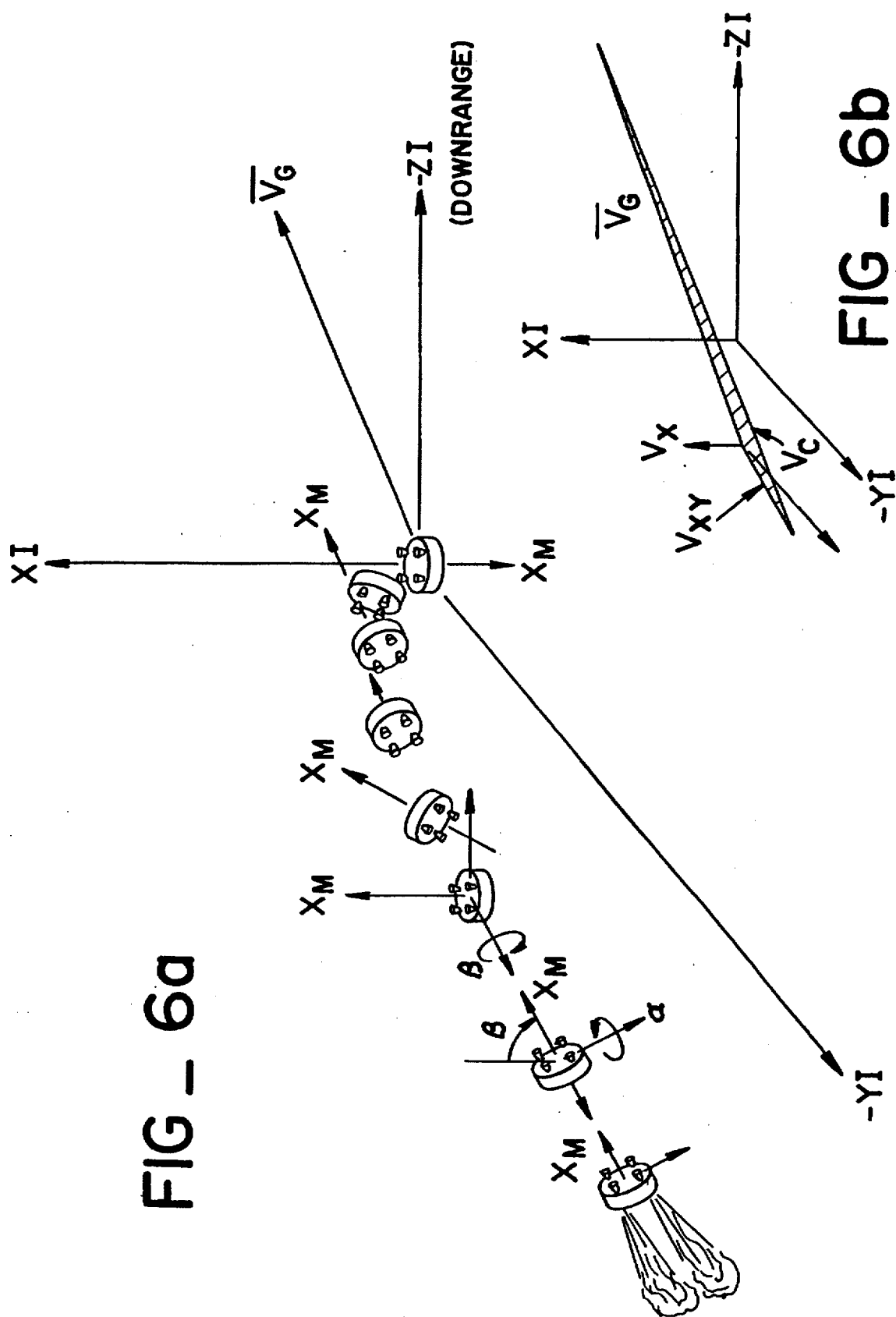

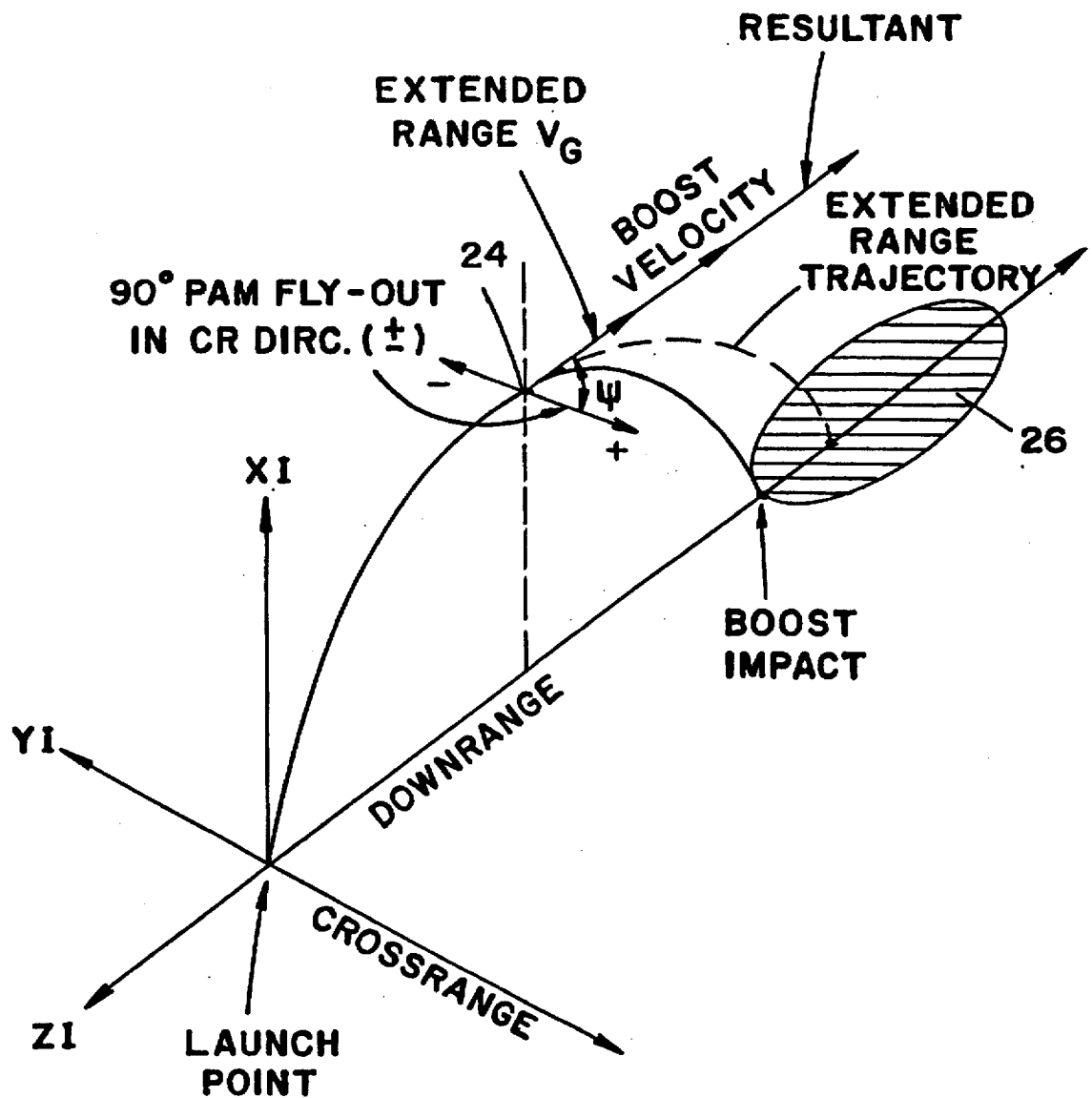
FIG_6c

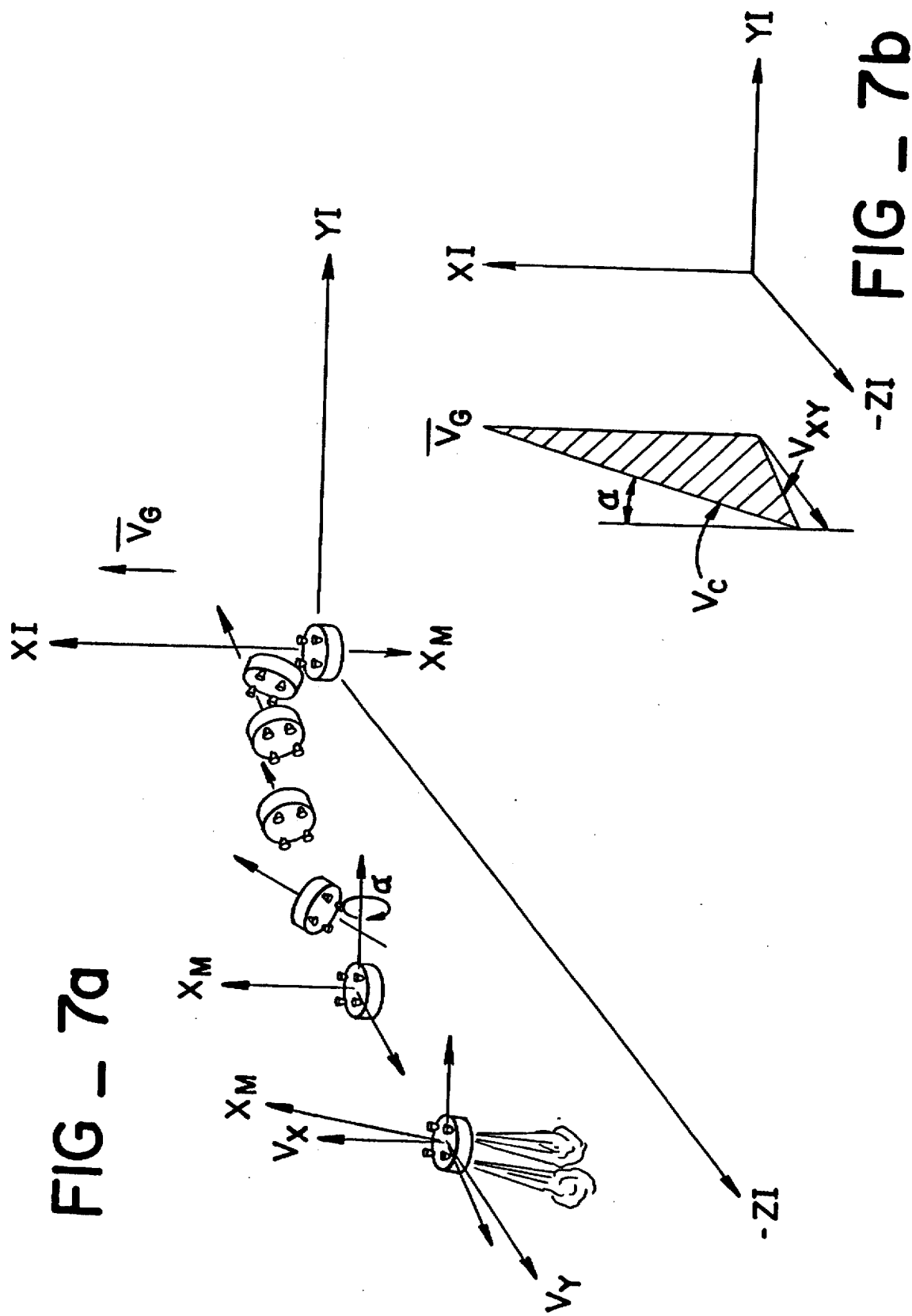

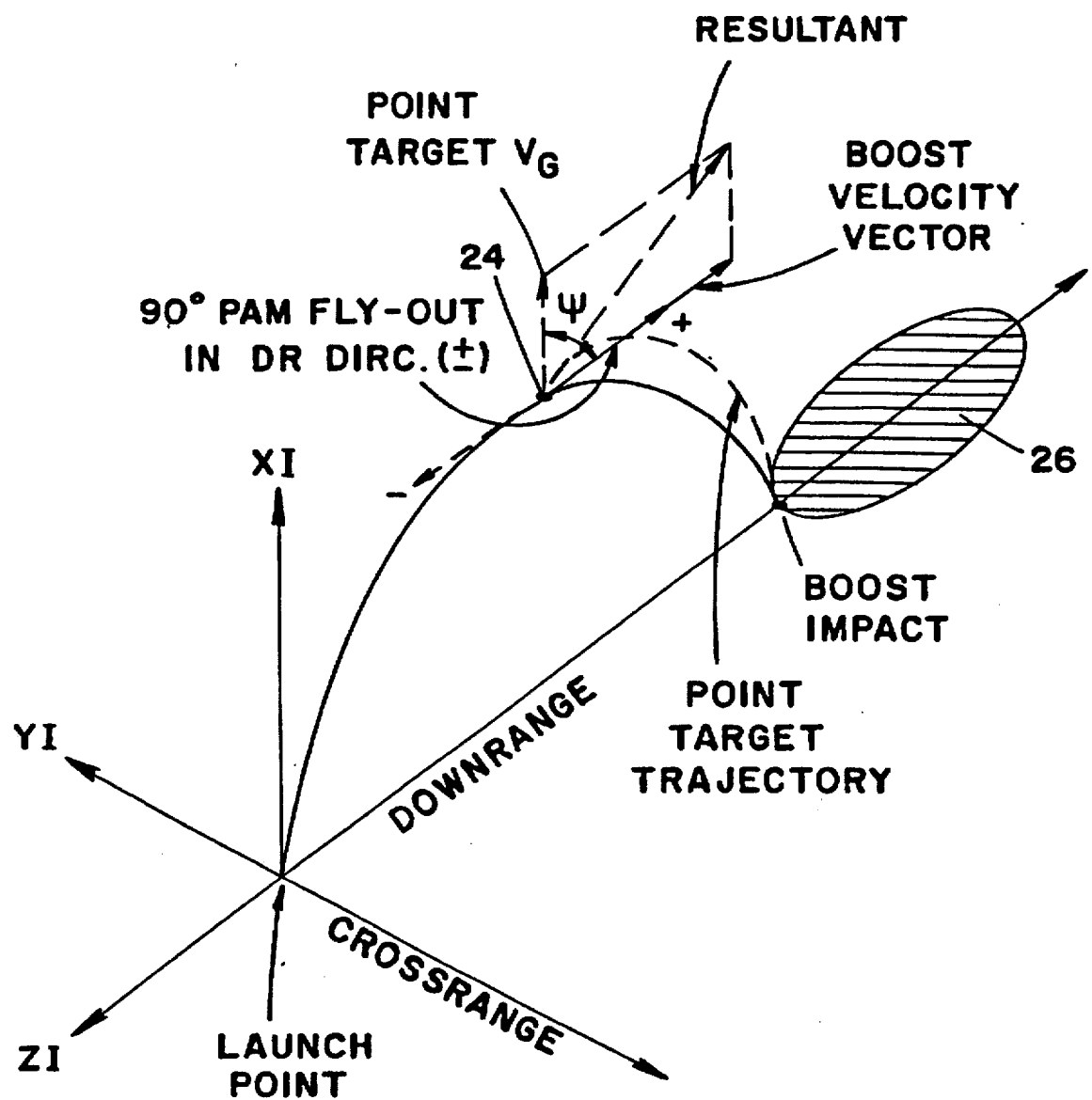
FIG_7c

PLUME AVOIDANCE MANEUVERS

BACKGROUND OF THE INVENTION

This invention relates in general to ballistic missile systems and, in particular, to deployment of re-entry bodies during the post-boost phase of a mission profile. This invention relates especially to a method for minimizing the perturbation on the most-recently deployed re-entry body from gas dynamic pressure acting on the re-entry body from gases exhausting from the nozzles of the post-boost control system.

In the deployment of a re-entry body from an aerospace platform, the accuracy of the trajectory of the re-entry body is a function of the accuracy of the re-entry body's predicted release velocity from the platform and the velocity perturbations that the re-entry body experiences after release. One of the most important contributions to velocity perturbations on a released re-entry body is from the gases exhausting from the nozzles on the platform as the platform is maneuvered to the next release location. The gases exhausting from the nozzles of the platform form a plume which may impinge on the reentry body if care is not taken to orient the platform to minimize the impingement. If the effect of the plume is predictable, compensation can be implemented for the resulting velocity perturbations. However, if the reentry body is impinged upon by an unmodelable portion of the plume, an unpredictable velocity may be imparted to the re-entry body causing a degradation in the predicable accuracy of the re-entry body's trajectory. This is especially troublesome when several nozzles are involved because the area between the nozzles where the gases from the nozzles mix is unmodelable.

SUMMARY OF THE INVENTION

It is therefore an object of the present invention to increase the accuracy of the predicted trajectory of a re-entry body.

Another object is to reduce the velocity perturbations that a re-entry body experiences immediately after release from an aerospace platform.

Another object is to minimize the perturbations on the most-recently deployed re-entry body from the gas dynamic pressure of the gases exhausting from the nozzles of the post-boost control system.

Another object is to provide a deployment maneuver for the platform which minimizes the impingement on the most-recently released re-entry body of the gases exhausting from the nozzles of the post-boost control system.

A further object is to provide a deployment maneuver which minimizes the impingement of the exhaust gases and at the same time minimizes the fuel penalty required to accomplish the maneuver.

These and other objects are provided by a plume avoidance maneuver in which, after release of the re-entry body from a position compatible accomplishing with the maneuver, a flip turn is initiated in a near-nozzle-off configuration. The turn is preferably executed in a direction to the side of the direction of the velocity gain required for the platform to reach the next release location. The flip turn provides initial vertical and lateral separation of the platform from the released re-entry body while the exhaust of the thrusters is turned away from the re-entry body. The flip turn is stopped at a lateral escape angle, preferrably after turning through an angle of 90 degrees or greater, by initiating an oppositely directed body-axis turn. The platform is then accelerated for a lateral escape time to provide a lateral escape distance between the platform and the re-entry body to allow more flexibility in subsequent maneuvering. After the platform has traversed the lateral escape distance, the platform is oriented in the direction of the required gain in velocity to reach the next release location and coarse thrust is activated. Prior to arrival at the release location, a body-axis turn is accomplished to orient the platform in the proper position for the next release event.

The advantages and features of the present invention will be better understood from the following detailed description of the preferred embodiment when considered in conjunction with the accompanying drawings wherein:

BRIEF DESCRIPTION OF THE DRAWINGS

FIG. 1 is a simplified diagramatic view of an aerospace platform illustrating elements of a post-boost control system;

FIG. 2 is a simplified pictorial view of an aerospace platform;

FIG. 3 is a plan view of the aerospace platform of FIG. 2;

FIGS. 4a and 4b are a series of schematic views illustrating a basic plume avoidance maneuver as contemplated by this invention;

FIGS. 5a, 5b and 5c are a schematic illustration of plume avoidance maneuver, a velocity closure diagram and a trajectory diagram, respectively, for a cross range mission;

FIGS. 6a, 6b and 6c are a schematic illustration of the plume avoidance maneuver, a velocity closure diagram and a trajectory, respectively, for an extended range mission.

FIGS. 7a, 7b, and 7c are a schematic illustration of the plume avoidance maneuver, a velocity closure diagram and a trajectory diagram, respectively, for a point target mission.

The post-boost control system which provides attitude and velocity control for the platform 10 includes two solid propellant gas generators 12 (operated sequentially) which are coupled in parallel by a manifold 14 to four valve clusters 1, 2, 3 and 4. Each valve cluster includes two opposing high thrust nozzles A and B, oriented to provide thrust parallel to the missile (and platform) longitudinal axis $X_m$ in the +$X_m$ direction and -$X_m$ direction, respective. The post-boost control system which provides attitude and velocity control for the platform 10 includes two solid propellant gas generators 12 (operated sequentially) which are coupled in parallel by a manifold 14 to four valve clusters 1, 2, 3 and 4. Each valve cluster includes two opposing high thrust nozzles A and B oriented to provide thrust parallel to the missile (and platform) longitudinal axis $X_m$ in the +$X_m$ direction and -$X_m$ direction, respectively. Each valve cluster 1, 2, 3 and 4 also includes two opposing low thrust nozzles C and D (roll valves) oriented to provide thrust in the plane normal to the missile longitudinal axis $X_m$. Each nozzle can be independently opened and closed by a command signal from the autopilot (not shown) of the control system. The valves are operated in the pulse-width modulation mode; that is, the valves are commanded on and off to provide an average effective throat area and effective average thrust over the on/off cycle.

There are in general two operating modes: (1) coarse mode for providing velocity increments for deployment spacing between a plurality of payload packages, and (2) vernier mode for precise attitude and deployment control. During the coarse mode a higher pressure is maintained at the gas generator 12 which provides a high propellant burn-rate and thus a higher thrust through the valves. During the vernier mode, a lower pressure is maintained at the gas generator 12 to provide a lower burn rate and thus a lower thrust through the valves. In order to maintain the required pressure at the gas generator 12, the combined nozzle throat area presented by all the valves is maintained essentially constant during each mode.

In the vernier mode, averaged over the modulation period, one half (four) of the high thrust and one half (four) of the low thrust nozzles are open to keep the gas generator pressure bounded. This presents the highest programmed flow area (combined throat area) to the gas generator. The gas generator thus operates at the minimum expected pressure and thrust which is more efficient for attitude and deployment control. The coarse mode is used to accelerate the platform 10 in a particular direction. In this mode, the high thrust nozzles A and B which provide thrust in the required direction are commanded to a percentage of the maximum area as determined by the system design while the other high thrust nozzles are closed. The autopilot modifies the valve control within this basic arrangement to maintain precise attitude and trajectory control while compensating for the effects of center-of-gravity offsets, valve tolerances, variations in propellant burn rate, and other variables in the post-boost control system.

Referring now to FIGS. 2 and 3, a simplified platform 10 is illustrated having eight high thrust valves with nozzles disposed parallel to the missile longitudinal axis $X_m$. Four of the valves have nozzles 1A, 2A, 3A, and 4A oriented in the $+X_m$ direction (providing thrust in the $-X_m$ direction) and located symmetrically around the platform 10 at 90 degree intervals. The other four high thrust valves have nozzles 1B, 2B, 3B, and 4B which are oriented to thrust in the $+X_m$ direction opposing the thrust of nozzles 1A, 2A, 3A, and 4A, respectively. For clarity the eight low thrust roll nozzles C and D (see FIG. 1) are not shown in FIGS. 2 and 3. A plurality of re-entry bodies represented by cone 20 are mounted on the $+X_m$ side of the platform 10. FIGS. 2 and 3 illustrate two coordinate systems which are used hereinafter in explaining the method of the present invention—a platform oriented coordinate system $X_m$, $Y_m$, and $Z_m$ and an inertial coordinate systems XI, YI, and ZI moving at the velocity of the platform at the release location.

FIG. 4 illustrates the basic plume avoidance maneuver of the present invention. The plume avoidance maneuver or, more accurately, the gas dynamics variability minimization maneuver, is undertaken to minimize the perturbations on the velocity of the last-released re-entry body due to the gases exhausted from the thrusters during the deployment of the platform 10 for the next re-entry-body release during the post-boost stage of the missile flight. As noted earlier, four of the high-thrust nozzles are open at all times. Consequently, a just-released re-entry body 20, which has been mechanically ejected from the platform with a small velocity, will be disturbed by the gases exhausted from the high thrust nozzles if care is not taken to minimize the impingement of the gases or at least keep the re-entry body out of the unmodelable core of the plume. Any impingement on the re-entry body by the unmodelable portion of the plume will cause unpredictable velocity increments to be imparted to the re-entry body which will degrade the predictable accuracy of the re-entry body's trajectory.

Phase 1 of the plume avoidance maneuver starts at the release of the re-entry body 20. Prior to phase 1, the platform 10 has been rotated so that the location of the to-be-released re-entry body on the platform relative to the next target direction is compatible with executing the maneuver as illustrated in the FIGS. 4–7. This pre-maneuver (pre-roll) to position the re-entry body in the proper location is accomplished by using the roll thrusters C and D during the coarse mode thrust (phase 8 as described hereinafter). During the release of the re-entry body 20, the impingement of the thrusters is minimized by operating the thrusters in the the near-nozzle-off (NNO) configuration. In the near-nozzle-off configuration, the nozzle nearest the re-entry body is closed (a B nozzle since the re-entry bodies are on the $+X_m$ side of the platform) and the three other B nozzles are opened. The A nozzle opposite the B nozzle which is next closest to the re-entry body is also opened to provide a fourth open nozzle. The remaining three A nozzles are closed. This near-nozzle-off configuration satisfies the constraint that four thrusters must be on at all times to keep the gas generator pressure bounded. If the re-entry body is released from the position shown in FIGS. 2 and 3, nozzles 2B (the nearest nozzle), 2A, 3A, and 4A are closed. Nozzles 3B, 4B, 1B (the next nearest nozzle), and 1A (the A nozzle opposite the next nearest nozzle 1B) are opened.

As shown in FIG. 4a, the thrust produced by this configuration causes the platform 10 to start a flip turn in a horizontal direction and at some angle (preferably 90 degrees) with respect to the next target direction. This turns the plume 22 away from the just-released re-entry body 20 and also imparts both an upward velocity and a lateral velocity to the platform.

After the platform 10 has turned through an angle of approximately ⅔ in the phase 1 configuration (nearest nozzle off), phase 2 is initiated. In phase 2, two A thrusters and two B thrusters are operated to exert maximum effort body-axis turn to stop the flip turn of the platform 10 at 0.

With the platform 10 oriented in direction 0, phase 3 provides a lateral escape distance from the re-entry body 20 by thrusting with all four B thrusters for lateral escape time T1. The lateral escape angle 0 is selected to ensure that the plume 22 does not impinge on the re-entry body 20 during phase 3. In the case illustrated, the lateral escape angle equals 110 degrees which ensures that the plume 22 is directed above and away from the re-entry body 20. A lateral escape angle of greater than 90 degrees also cancels some of the upward velocity that was imparted to the platform 10 during the flip turn of phase 1. The lateral escape phase provides a pad in distance which allows more flexibility in subsequent maneuvering.

After the platform 10 is propelled away from the re-entry body 20 the lateral direction for time T1, phases 4, 5, 6, and 7 implement body-axis turns and/or rotations as required to orient the platform 10 for application of coarse mode thrust in phase 8. Phases 4 and 5 implement a body-axis turn in the counterclockwise direction that ensures that the plumes 22 of the thrusters turn away from the re-entry body. Phases 6 and 7 implement a body-axis turn to orient the platform 10 in the proper direction for applying coarse mode thrust for supplying the increase in velocity, $V_g$, required to reach the next release location. FIGS. 5a, 6a, and 7a illustrate the rotations of phases 6 and 7 more clearly. Again the direction of the turn ensures that the plumes 22 are directed away from the re-entry body 20.

When the platform is oriented at the proper angle, phase 8 comprises operating the A thrusters in the high-thrust coarse mode to gain the velocity required to reach the next release location. Phases 9 and 10 implement a body-axis turn to properly orient the platform 10 for the release of the next re-entry body 20. Note that in the example illustrated in FIGS. 4a and 4b, the $V_g$ is directed out of the plane of the paper in FIG. 4a (90° fly-out) and is in the plane of the paper in FIG. 4b (0° fly-out).

The autopilot may employ the roll thrusters C and D during all phases as necessary to implement the body-axis turns or rotations, to maintain stability or implement the required trajectory. In particular, the roll thrusters are used in conjunction with the A and B thrusters during coarse mode to attain a pre-roll angle necessary for execution of the next plume avoidance maneuver.

FIGS. 5a, 6a, and 7a illustrate plume avoidance maneuvers for a cross range mission ($V_g$ is in a XI-YI plane), an extended range mission ($V_g$ is in a XI-ZI plane), and a point target mission ($V_g$ is in a XI-YI plane), respectively. FIGS. 5b, 6b, and 7b are velocity closure diagrams illustrating the velocities imparted to the re-entry body during the respective maneuvers. Angles $\alpha$ and $\beta$ are Euler angles and $V_x$, $V_y$, and $V_z$ are the velocities in the XI, YI and ZI directions. $V_{xz}$, and $V_{xy}$ are resultants of the velocities $V_x$, $V_z$ and $V_x$, $V_y$ and lie in XI-ZI plane and XI-YI plane, respectively. $V_c$ is the closure velocity to attain the required $V_g$.

In each case, the maneuver begins with a flip turn in a direction normal to the direction of $V_g$. The turn is executed in the near-nozzle-off configuration as shown in FIG. 4. The flip turn is followed by a lateral escape in the plane normal to direction $V_g$ to provide a separation distance between the platform 10 and the just-released re-entry body 20. The platform 10 is then turned to an orientation common to each maneuver in preparation for orienting the platform for the coarse mode of operation. The residual lateral velocity from the lateral separation phase provides additional separation as additional body-axis turns are implemented to orient the platform 10 in the proper direction for velocity closure to reach the next release location.

FIGS. 5c, 6c, and 7c illustrate ninety degree fly-out plume avoidance maneuvers for a cross range mission, an extended range mission, and a point target mission, respectively, in the context of the mission trajectory from launch location to the impact footprint 24. In each Figure, the diagram depicts the simplified case where the fly-out $\Delta V$ (the change in velocity from the re-entry-body-release location 26 is very much less than the required $V_g$.

It will be recognized that the maneuver may be initiated in a direction which is less than normal to the plane of $V_g$ (or even in the plane of $V_g$). This will usually result in some fuel savings when compared to a fly-out in a direction normal to the plane of $V_g$. However, the fuel savings must be traded against increased perturbation of the velocity of the just-released re-entry body for $V_g$'s.

Obviously many modifications and variations of the present invention are possible in light of the above teachings. It is therefore to be understood that within the scope of the appended claims the invention may be practiced otherwise than as specifically described.

What is claimed is:

1. A method for minimizing perturbations on a released re-entry body released from an aerospace platform, which aerospace platform is moving in a generally ballistic path at a post-boost velocity, said aerospace platform bearing a plurality of releasable re-entry bodies mounted thereon, and said platform also having a fueled post-boost control system which includes a gas generator containing fuel and a plurality of nozzles for exhausting gases from the gas generator fuel to control the direction, orientation and velocity of said platform to achieve a desired pre-selected location for release of a releasable re-entry body, said perturbations on a released re-entry body being due to gases being exhausted from the nozzles of the post-boost control system of said aerospace platform during deployment of the platform to a desired pre-selected re-entry-body-release location for release of a releasable re-entry body, which method comprises:

(a) initiating a flip turn of said platform which is moving in a generally ballistic path at a post-boost velocity, said flip turn being in a first direction away from the direction required to reach said desired pre-selected re-entry-body-release location;

(b) stopping said flip turn after said platform has turned through a first predetermined angle;

(c) accelerating said platform in said first direction and at said predetermined angle to provide a lateral escape distance between the platform and the previously released re-entry body;

(d) turning said platform to establish a platform longitudinal axis orientation in the direction required to reach said desired pre-selected re-entry-body-release location;

(e) accelerating said platform to provide the required velocity to reach said desired pre-selected re-entry-body-release location;

(f) turning said platform to orient said platform in the proper orientation for release of said re-entry body.

2. A method as recited in claim 1 wherein said step of initiating a flip turn is accomplished by operating the nozzles in a near-nozzle-off configuration.

3. A method as recited in claim 2 wherein said step of initiating a flip turn comprises initiating a flip turn of said platform in a horizontal direction normal to the direction of the velocity gain required to reach the next re-entry-body-release location.

4. A method as recited in claim 1 wherein said step of stopping said flip turn after said platform has turned through a first predetermined angle comprises:

(a) initiating a body-axis turn opposing the flip turn.

5. A method as recited in claim 4 wherein said step of stopping said flip turn after said platform has turned through a first predetermined angle comprises:

(a) stopping said flip turn after said platform has turned through an angle of at least 90 degrees.

6. A method as recited in claim 4 wherein said step of turning said platform to establish a platform longitudinal axis orientation comprises:

(a) turning said platform from said predetermined angle to a horizontal orientation; and (b) turning said platform from said horizontal orientation to establish a platform longitudinal axis orientation in the direction of the required velocity to reach the next re-entry-body-release location.

7. A method for maneuvering an aerospace platform, said platform having a generally ballistic trajectory and bearing at least two releasable re-entry bodies thereon, said platform further having a fueled, post-boost control system of the type having four valve clusters, each valve cluster including two opposing high thrust nozzles oriented to provide oppositely directed thrust parallel to the platform's longitudinal axis, each valve cluster further including two opposing low thrust nozzles oriented to provide oppositely directed thrust in the plane normal to the platform's longitudinal axis and thereby control the direction, orientation and velocity of said platform prior to and after releasing a re-entry body, said maneuver after releasing a re-entry body providing a velocity required to reach a desired pre-selected re-entry-body-release location while minimizing perturbations on the just-released re-entry body due to gases exhausted from the nozzles of the post-boost control system during deployment of the platform to another desired pre-selected re-entry-body-release location and at the same time minimizing the fuel required to accomplish the maneuver, which method comprises:

(a) initiating a flip turn of said platform in a first direction away from the direction of the velocity required to reach said another desired pre-selected re-entry-body location, said step of initiating a flip turn being accomplished by operating the nozzles nearest the just-released re-entry body in a near-nozzle-off configuration;

(b) stopping said flip turn after said platform has turned through a first predetermined angle;

(c) accelerating said platform in said first direction and at said predetermined angle to provide a lateral escape distance between the platform and the just-released re-entry body;

(d) turning said platform to establish a platform longitudinal axis orientation in the direction of the required velocity to reach the desired pre-selected next-re-entry-body location;

(e) accelerating said platform to provide the required velocity to reach the next desired pre-selected re-entry-body-release location; and (f) turning said platform to orient said platform in the proper orientation for release of the next re-entry body in the desired pre-selected location.

* * * * *